US008037539B2

(12) United States Patent
Shapiro et al.

(10) Patent No.: US 8,037,539 B2
(45) Date of Patent: *Oct. 11, 2011

(54) SYSTEM AND METHOD FOR PROVIDING ACCESS TO VERIFIED PERSONAL BACKGROUND DATA

(75) Inventors: Eileen C. Shapiro, Cambridge, MA (US); Steven J. Mintz, Saddle River, NJ (US)

(73) Assignee: VeriVita LLC, Cambridge, MA (US)

( * ) Notice: Subject to any disclaimer, the term of this patent is extended or adjusted under 35 U.S.C. 154(b) by 973 days.

This patent is subject to a terminal disclaimer.

(21) Appl. No.: 10/786,355

(22) Filed: Feb. 25, 2004

(65) Prior Publication Data

US 2004/0168080 A1    Aug. 26, 2004

Related U.S. Application Data

(63) Continuation of application No. 09/472,080, filed on Dec. 23, 1999, now Pat. No. 6,714,944.

(60) Provisional application No. 60/168,094, filed on Nov. 30, 1999.

(51) Int. Cl.
*G06F 7/04* (2006.01)

(52) U.S. Cl. ......................................... 726/27; 713/168

(58) Field of Classification Search .................... 726/27; 713/168; 707/3, 10; 705/1, 26, 37
See application file for complete search history.

(56) References Cited

U.S. PATENT DOCUMENTS

| | | | |
|---|---|---|---|
| 5,070,452 A | 12/1991 | Doyle, Jr. et al. ............. 364/401 |
| 5,164,897 A | 11/1992 | Clark et al. ................... 364/401 |
| 5,384,703 A | 1/1995 | Withgott et al. .............. 364/419 |
| 5,416,694 A | 5/1995 | Parrish et al. ................. 364/401 |
| 5,418,951 A | 5/1995 | Damashek .................... 395/600 |
| 5,537,586 A | 7/1996 | Amram et al. ................ 395/600 |
| 5,649,186 A | 7/1997 | Ferguson ...................... 395/610 |
| 5,706,507 A | 1/1998 | Schloss ......................... 395/615 |
| 5,748,738 A * | 5/1998 | Bisbee et al. ................. 713/176 |
| 5,758,324 A | 5/1998 | Hartman et al. .................. 705/1 |
| 5,799,304 A | 8/1998 | Miller ............................... 707/7 |
| 5,832,447 A | 11/1998 | Rieker et al. ...................... 705/2 |
| 5,832,497 A | 11/1998 | Taylor ........................... 707/104 |
| 5,862,223 A | 1/1999 | Walker et al. ..................... 380/25 |
| 5,864,871 A | 1/1999 | Kitain et al. ................... 707/104 |
| 5,867,821 A * | 2/1999 | Ballantyne et al. .............. 705/2 |
| 5,884,270 A * | 3/1999 | Walker et al. ..................... 705/1 |
| 5,884,272 A | 3/1999 | Walker et al. ..................... 705/1 |
| 5,905,862 A | 5/1999 | Hoekstra ....................... 395/200 |
| 5,956,400 A | 9/1999 | Chaum et al. ..................... 380/4 |
| 5,978,768 A * | 11/1999 | McGovern et al. ............... 705/1 |
| 6,061,789 A | 5/2000 | Hauser et al. ................. 713/168 |
| 6,115,709 A | 9/2000 | Gilmour et al. ................... 707/9 |
| 6,205,480 B1 | 3/2001 | Broadhurst et al. .......... 709/225 |
| 6,324,538 B1 * | 11/2001 | Wesinger et al. .............. 707/10 |
| 6,370,510 B1 | 4/2002 | McGovern et al. ............... 705/1 |
| 6,381,592 B1 | 4/2002 | Reuning .......................... 707/3 |
| 6,466,914 B2 | 10/2002 | Mitsuoka et al. ................ 705/9 |
| 6,658,400 B2 | 12/2003 | Perell et al. ...................... 707/1 |

* cited by examiner

*Primary Examiner* — Beemnet Dada
*Assistant Examiner* — Suman Debnath
(74) *Attorney, Agent, or Firm* — Sunstein Kann Murphy & Timbers LLP

(57) ABSTRACT

Access to verified personal background data is provided in the form of an electronic document that includes a data record having personal background data and corresponding verification information as well as an electronic authentication of the contents of the data record. The data record is associated with a unique identifier. The electronic document may be distributed over a communication network to a person providing the identifier.

16 Claims, 16 Drawing Sheets

SYSTEM AND METHOD FOR PROVIDING ACCESS TO VERIFIED PERSONAL BACKGROUND DATA

CROSS-REFERENCE TO RELATED APPLICATIONS

This application is a continuation of application Ser. No. 09/472,080, filed Dec. 23, 1999, which claims the benefit of provisional application Ser. No. 60/168,094, filed Nov. 30, 1999; these related applications are hereby incorporated herein by reference.

TECHNICAL FIELD

The present invention relates to systems and methods for authenticating and registering personal background data, including over networks and particularly the Internet.

BACKGROUND ART

Misrepresentations by job applicants of their backgrounds put employers at risk of hiring persons lacking in training or experience that employers were counting on when the applicants were hired. Indirectly such misrepresentations, besides camouflaging the absence of training or experience, also are indicative of potentially unreliable employees. Employers also risk public embarrassment when an employee's misrepresentations are discovered, regardless of the employee's job performance. There have therefore arisen over time a variety of services providing background checking of applicants for employment.

SUMMARY OF THE INVENTION

In accordance with one aspect of the invention, access to verified personal background data is provided in the form of an electronic document that includes a data record having personal background data and corresponding verification information as well as an electronic authentication of the contents of the data record. The data record is associated with a unique identifier. The electronic document may be distributed over a communication network to a person providing the identifier.

In one embodiment there is provided a method of providing access to a candidate's verified personal background data. A data record relating to the candidate's personal background data is established in a digital storage medium. The data record is associated with a unique identifier and includes a set of potentially verifiable components based on information supplied by the candidate and a corresponding set of query results, the corresponding set including, with respect to each component, the result of a verification query to a third party. The identifier is communicated to the candidate, who may directly or indirectly provide the identifier to others. Upon receipt of the identifier from an outside user over a communication network, an electronic document including the data record and an electronic authentication of the contents of the data record is distributed to the outside user over the communication network. The electronic authentication is capable of revealing unauthorized modifications of the contents of the data record.

The electronic document may be distributed in the form of an electronic mail message or electronic file. The electronic document may be distributed over the Internet or other communication network. The electronic authentication may be an electronic watermark or electronic certification. The set of components may include the candidate's résumé information, in which case the set of query results may include information verifying the candidate's résumé information.

In another embodiment there is provided a system for providing access to a candidate's verified personal background data. The system includes a storage arrangement on which is stored a database having a plurality of data records. Each data record relates to personal background data of a candidate. Each data record is associated with a unique identifier that is communicated to the candidate and includes a set of potentially verifiable components based on information supplied by a candidate and a corresponding set of query results, the corresponding set including, with respect to each component, the result of a verification query to a third party. The system also includes a process, running on a computer in communication with the digital storage medium, for selectively distributing, to an authorized person presenting an identifier received directly or indirectly from a candidate, over a communication network, an electronic document including the candidate's data record and an electronic authentication of the contents of the data record, the electronic authentication capable of revealing unauthorized modifications of the contents of the data record.

In yet another embodiment there is provided a computer-readable medium having embodied therein an electronic document including a data record and an electronic authentication of the contents of the data record. The data record includes a set of potentially verifiable components based on information supplied by a candidate and a corresponding set of query results, the corresponding set including, with respect to each component, the result of a verification query to a third party. The electronic authentication is capable of revealing unauthorized modifications of the contents of the data record.

The electronic authentication may be an electronic watermark or electronic certification. The set of components may include the candidate's résumé information, in which case the set of query results may include information verifying the candidate's résumé information.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
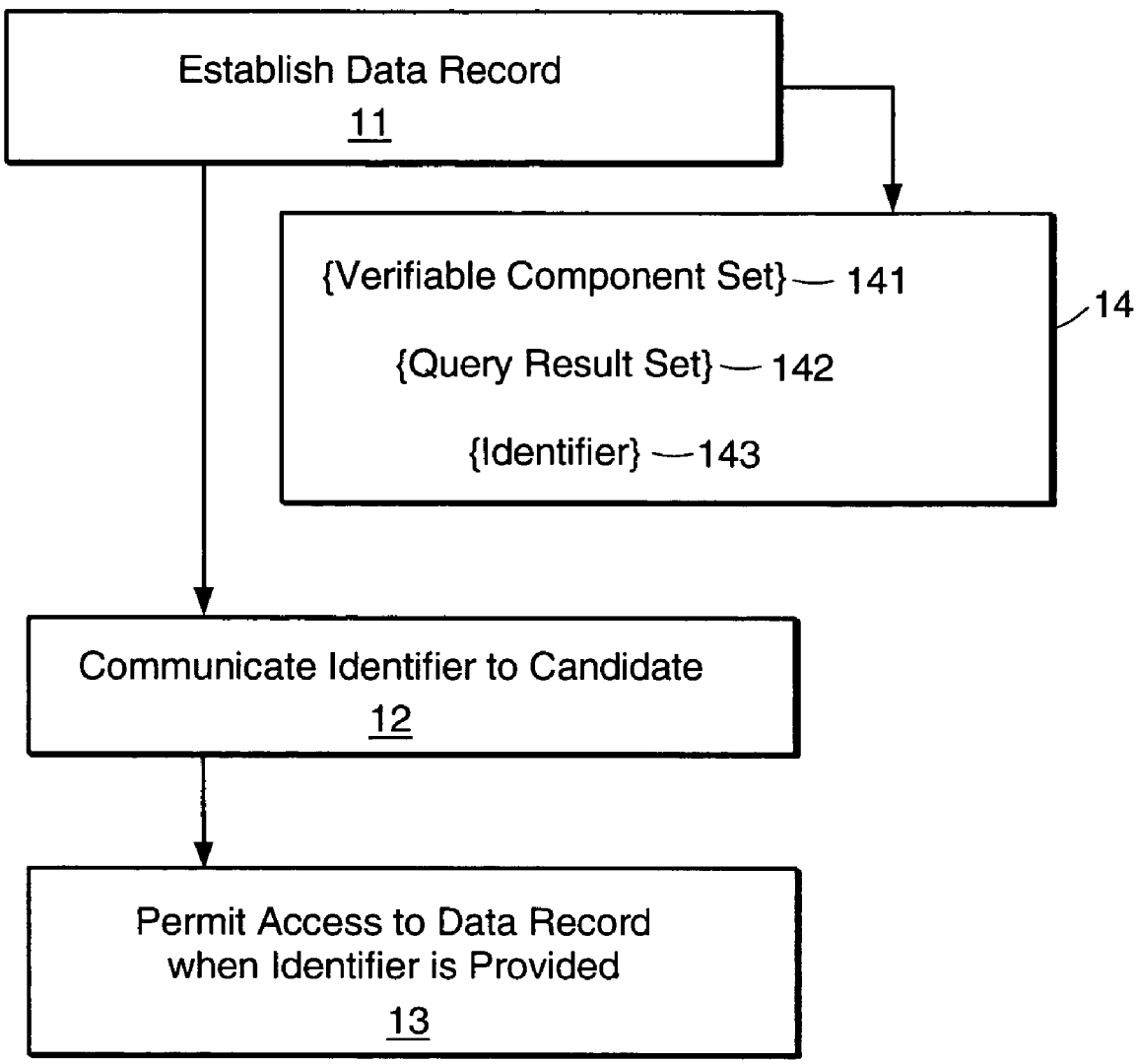
FIG. 1 is a block diagram of an embodiment of a method in accordance with the present invention for authenticating a candidate's personal background data.

FIG. 1 is a block diagram of an embodiment of a method in accordance with the present invention for authenticating a candidate's personal background data. In box 11, there is established and stored a data record 14 that pertains to the personal background data. The data record has a unique identifier 143. The data record also includes a set 141 of components of the candidate's personal background data.

Each component of the set 141 is potentially verifiable. Examples of verifiable components of personal background data include present and previous employers of the candidate, dates of employment by each such employer, positions held at each employer and the dates such positions were held, names of persons who have agreed to serve as references for the candidate, and the dates they agreed to do so, the text of the references or recommendations, educational institutions from which the candidate was graduated, the degrees granted to such candidate, the dates on which such degrees were granted, branches of the armed forces in which the candidate served, periods of service in such branches, ranks held during such periods, type of discharge, military medals or honors, and so forth. What these components have in common is that they are objective; the components involve factual matters that are either correct or incorrect. Because the components are not affected by individual judgment, they are susceptible to verification by inquiry to the pertinent party, such as the employer or educational institution or branch of the armed forces.

The data record 141 also includes a corresponding set 142 of query results. The set 142 includes, with respect to each component, the result of a verification query to the pertinent third party. If, therefore, the component relates to the candidate's undergraduate degree, the verification query will be to the candidate's college, and the result will be a determination that the college did in fact (or did not) grant a degree to the candidate, and optionally in addition that the degree is indeed in the specified field, was indeed granted on the specified date, etc. These latter options illustrate that each query may optionally include one or more sub-queries.

The verifiable component set 141 may include the text of a reference that the candidate has ascribed to a recommending third party. In this case, there is generated a verification query to the recommending third party, and the query, in one embodiment, presents to the recommending third party the text of the reference. The query result set 142 therefore includes the determination that the recommending third party is indeed (or is not) the source of the reference. The query result set 142 also optionally includes the date that the recommending third party provided the reference.

In box 12 the identifier 143 is communicated to the candidate. In box 13, access to the data record 14 is permitted when the identifier 143 is provided. In this manner, verifiable components of the personal background data appear in the data record with authenticated results, and the data record is accessible to those who have been given the identifier by the candidate. The candidate is therefore able to provide selective access to the data record.

Thus, the candidate himself can provide access to his pre-authenticated background data, so that employers or others who are given access can trust the information they are given. Unlike conventional background-checking services, embodiments according to the invention do not require employers to conduct background checks on candidates. Rather, candidates themselves can provide employers with access to pre-authenticated background data.

Figure 2:
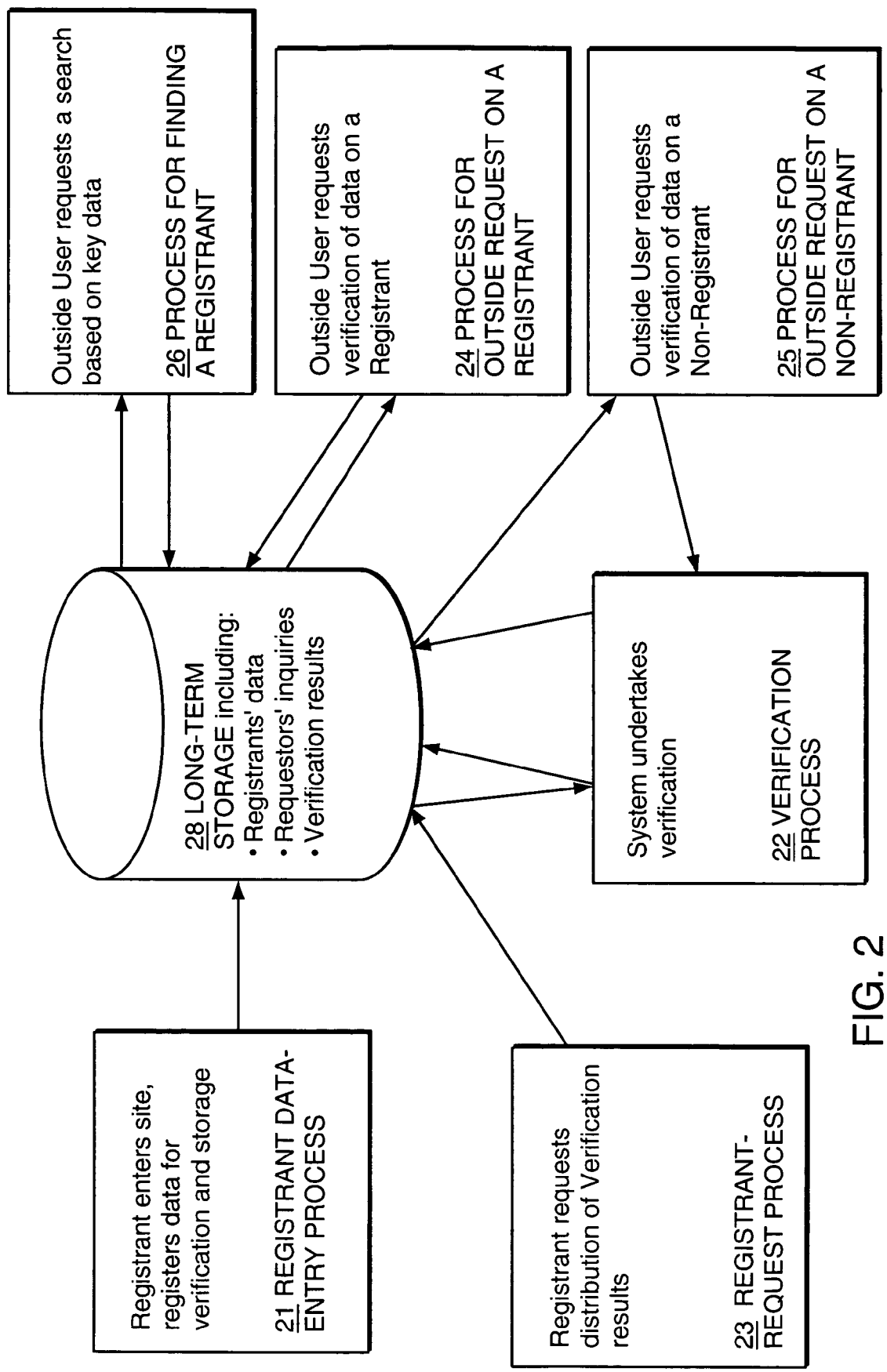
FIG. 2 is a block diagram illustrating generally a process flow associated with a further embodiment in accordance with the present invention.

FIG. 2 is a block diagram illustrating generally a process flow associated with a further embodiment in accordance with the present invention. In this method, long-term storage 28 communicates with six processes, as indicated by the arrows; each of these processes is described in further detail below: registrant data-entry process 21, verification process 22, registrant-request process 23, process 24 for outside requests on a registrant, process 25 for outside requests on a non-registrant, and process 26 for finding a registrant.

As will be described in further detail below, a registrant enters data in process 21, and the data is communicated to long-term storage 28 for verification and storage. One typical registrant is a job candidate, but may also be, for example, a candidate for admission to a school or other institution, as will be appreciated by those of skill in the art. Another typical registrant is a person who is currently in a job, but would like to be able to be found easily based on verifiable data, should the person change jobs or locations in the future. Once the registrant has entered data through process 21, the data is used for verification process 22. The registrant may then request distribution of verification results, as in registrant-request process 23. Also, an outside user may then request verification results, using process 24 for outside requests on a registrant. The outside user is typically an employer, but may also be a school or other institution that requires verification of personal background data. If an outside user requests verification of data on a person who is not a registrant, the method uses process 25, for outside requests on non-registrants, to undertake a verification process, including verification process 22, and to communicate data to long-term storage 28. In process 26, an outside user searches for a registrant using key data. Here, the outside user need not be an employer, but may be anyone who wishes to contact a person based on verified personal background data.

Figure 3:
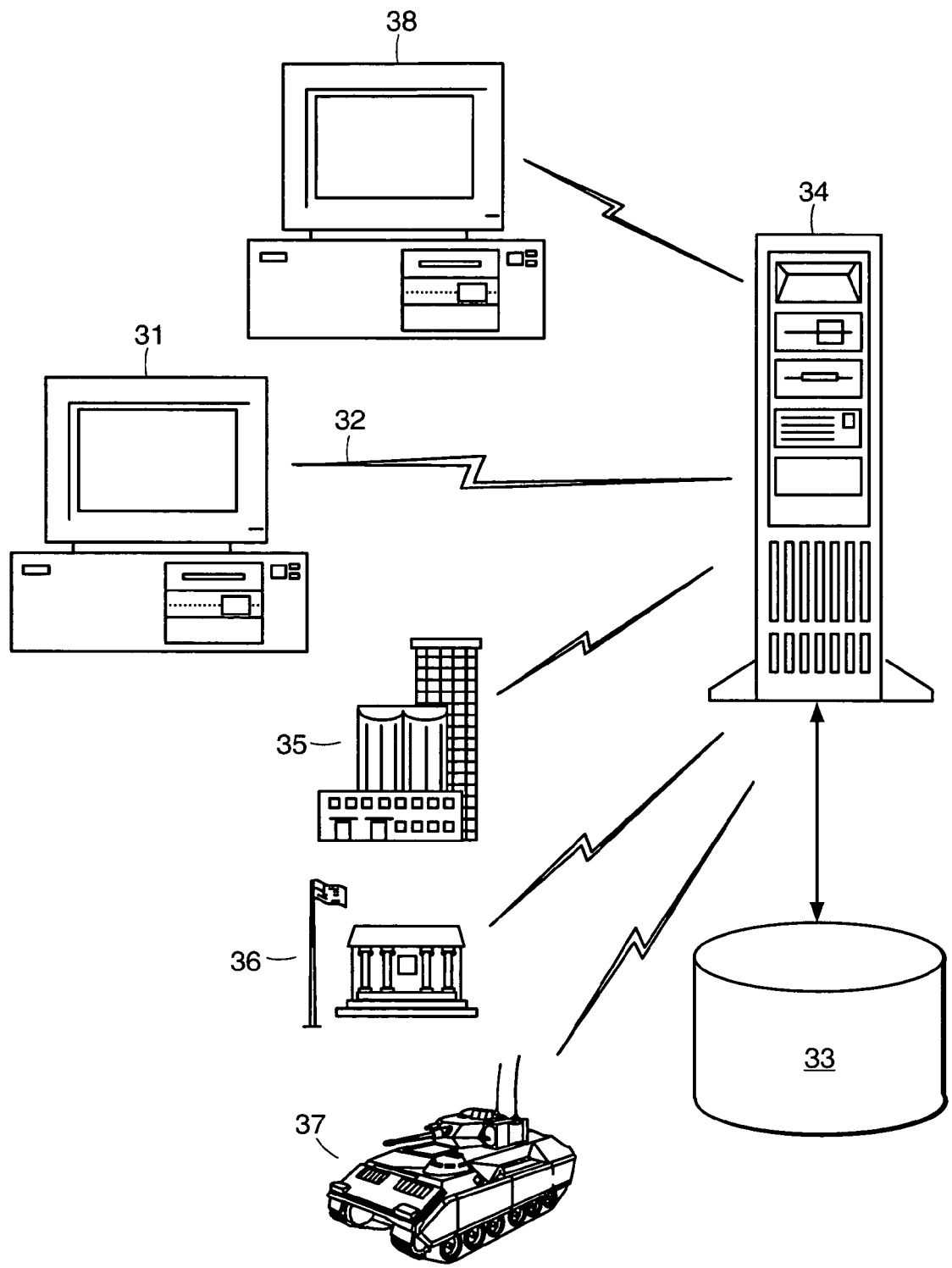
FIG. 3 is a diagram illustrating a system in accordance with the embodiment of the present invention for carrying out processes accordingly.

FIG. 3 shows an embodiment of a system in accordance with the present invention. Remote computer 31 is connected via a network 32, such as the Internet, to a host computer 34, which may be a World Wide Web server. In the latter case, the host computer 34 provides HTML pages (or pages in other languages, as known to those of skill in the art), for access by remote computer 31 by means of which may be entered data, as described below. Processes running on remote computer 31 and host computer 34 enable a job candidate or other registrant to enter personal data, including a set of data components for verification. The processes then communicate this data over network 32 to host computer 34, and store the data in a digital storage medium such as content storage 33, which may be realized as a hard disk drive.

Host computer 34 is connected to a plurality of computers of third parties via network 32, including, but not limited to, computers of employers (third party 35), educational institutions (third party 36), and military or other government institutions (third party 37). Host computer 34 runs a process which communicates verification queries, based on the stored registrant's data, over network 32 to computers of the third parties, including third parties 35, 36, and 37. Separate data components may be communicated to different parties over network 32. Thus, for example, a verifiable component that includes the data that a registrant attended a given university may be communicated to third party 36, while a verifiable component that includes the data that a registrant attained a given military rank may be communicated to third party 37. These parties' computers then run processes which communicate back query results to host computer 34, via network 32. A process running on host computer 34 stores the query results in a data record on digital storage medium 33, associating query results separately with each corresponding verifiable component.

An outside user's remote computer 38 is connected over network 32 to host computer 34. Processes running on computer 38 and host computer 34 enable the outside user to enter a verification request, including a set of components of personal background data for verification; this data is then communicated over network 32 to host computer 34, which stores the request in a digital storage medium such as content storage 33. Processes running on computer 34 determine whether the request is on a registrant or non-registrant. If it is on a registrant, the process retrieves the registrant's data record from digital storage medium 33, and communicates its data to the outside user's remote computer 38. If the request in on a non-registrant, the process performs the verification procedures described above for a registrant's request, and communicates the results to the outside user's remote computer 38.

Further information concerning the Internet and E-mail (both of which terms are used throughout this specification) is provided, for example, in Gralla, How the Internet Works (Ziff-Davis Press, 1996), which is hereby incorporated by reference; see especially pages 44-49.

FIGS. 4A through 9B illustrate the logical flow of methods according to embodiments of the invention. As will be appreciated by one of skill in the art, these logical flows also illustrate the components of processes running on computers in systems according to embodiments of the invention. For example, they may illustrate the processes described above for the system of FIG. 3, in a fashion known to those of skill in the art.

Figure 4A:
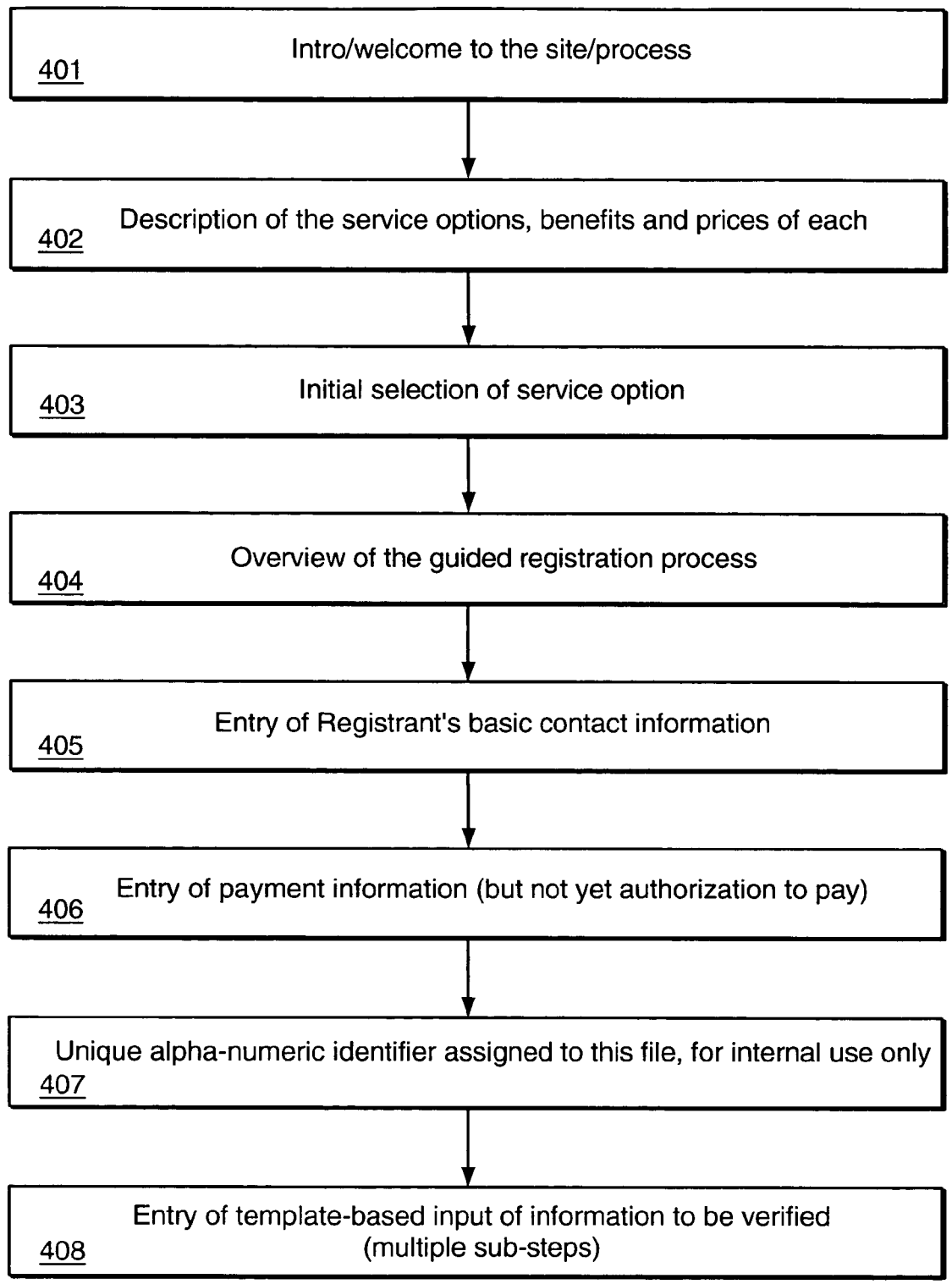
FIGS. 4A and 4B illustrate in further detail logical flow of the registrant data-entry process of an embodiment similar to that of FIG. 2.
Figure 4B:
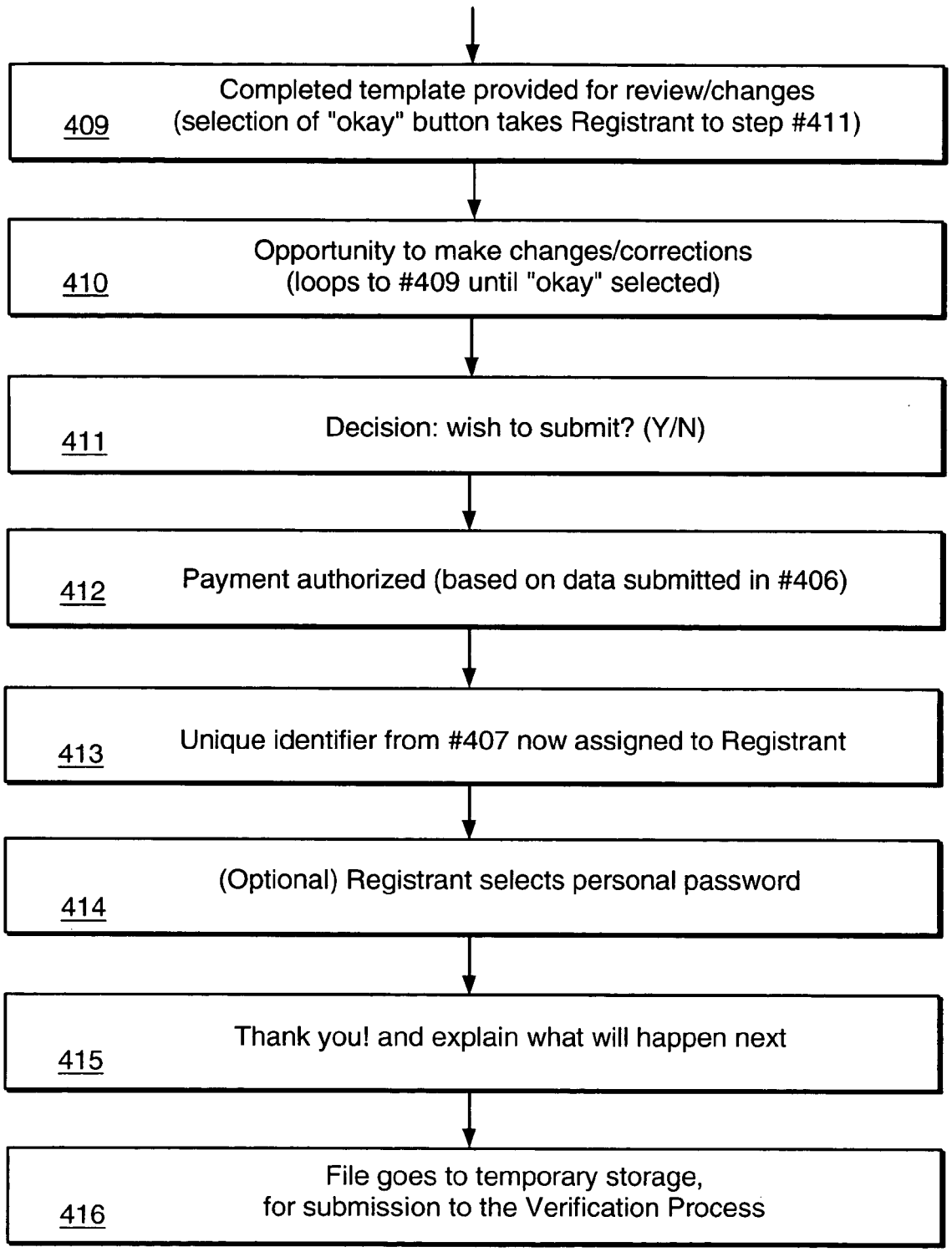

FIGS. 4A and 4B show the process flow for the registrant data-entry process, summarized as process 21 in FIG. 2. At box 401 of FIG. 4A, the user of a website is shown a welcome screen (HTML page) that introduces the user to the site, and to the process for data-entry that will be described below. At box 402, the registrant user is shown a description of the service options that the user may elect, including the benefits and prices of each. The user selects an initial service option at box 403, and is shown an overview of the guided registration process in box 404. At box 405, the registrant user enters his or her basic contact information, and at box 406 enters payment information, such as a credit card number. At box 407, upon receiving the registrant's information, the host computer assigns a unique alpha-numeric identifier to the file, for internal use only. At box 408, the registrant enters, via a template, the personal background data that he or she wishes to verify; each background data component to be verified may be entered using a different template.

The registrant data-entry process continues in FIG. 4B. The user is next shown, in box 409, a template containing the data that he or she completed, to review and modify as necessary. An "okay" button near the template allows the registrant to skip to box 411 (below); otherwise, box 409 forms a loop with box 410, in which the registrant is provided with an opportunity to make changes or corrections to the template data. The registrant is next provided with a yes/no decision on whether to submit the template data (box 411), and (if yes) payment is authorized (in box 412) based on the data that the user provided in box 406. The unique identifier temporarily assigned to the registrant in box 407 is now assigned to the registrant (box 413). In some embodiments, the registrant may now set a password, which gives access to his data record (box 414). In box 415, the registrant is shown a "thank you" message, and a summary explanation of the résumé verification process. At this point, the registrant's data file is sent to temporary storage, for later submission to the verification process described below.

Figure 5A:
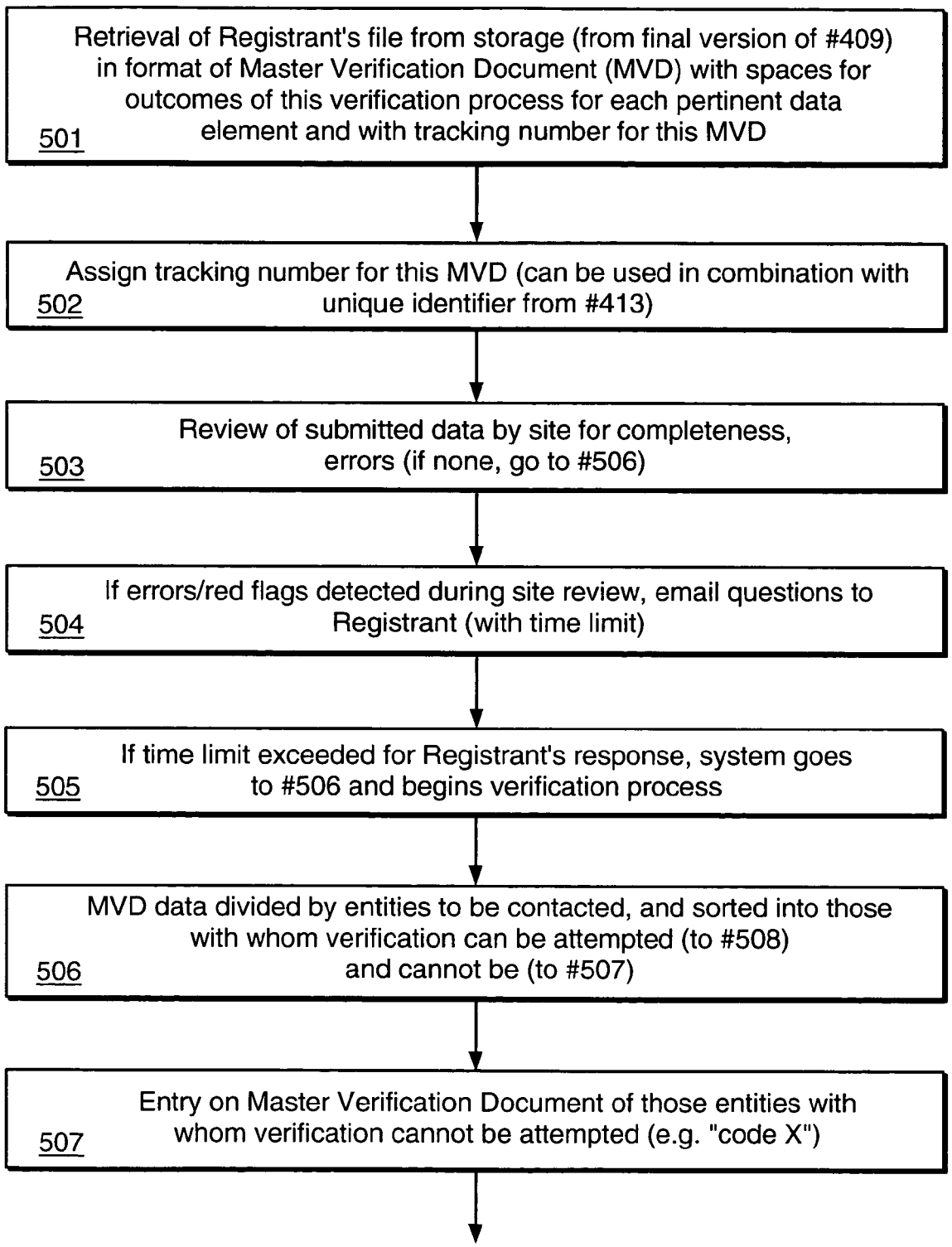
FIGS. 5A and 5B illustrate in further detail logical flow of the verification process of an embodiment similar to that of FIG. 2.
Figure 5B:
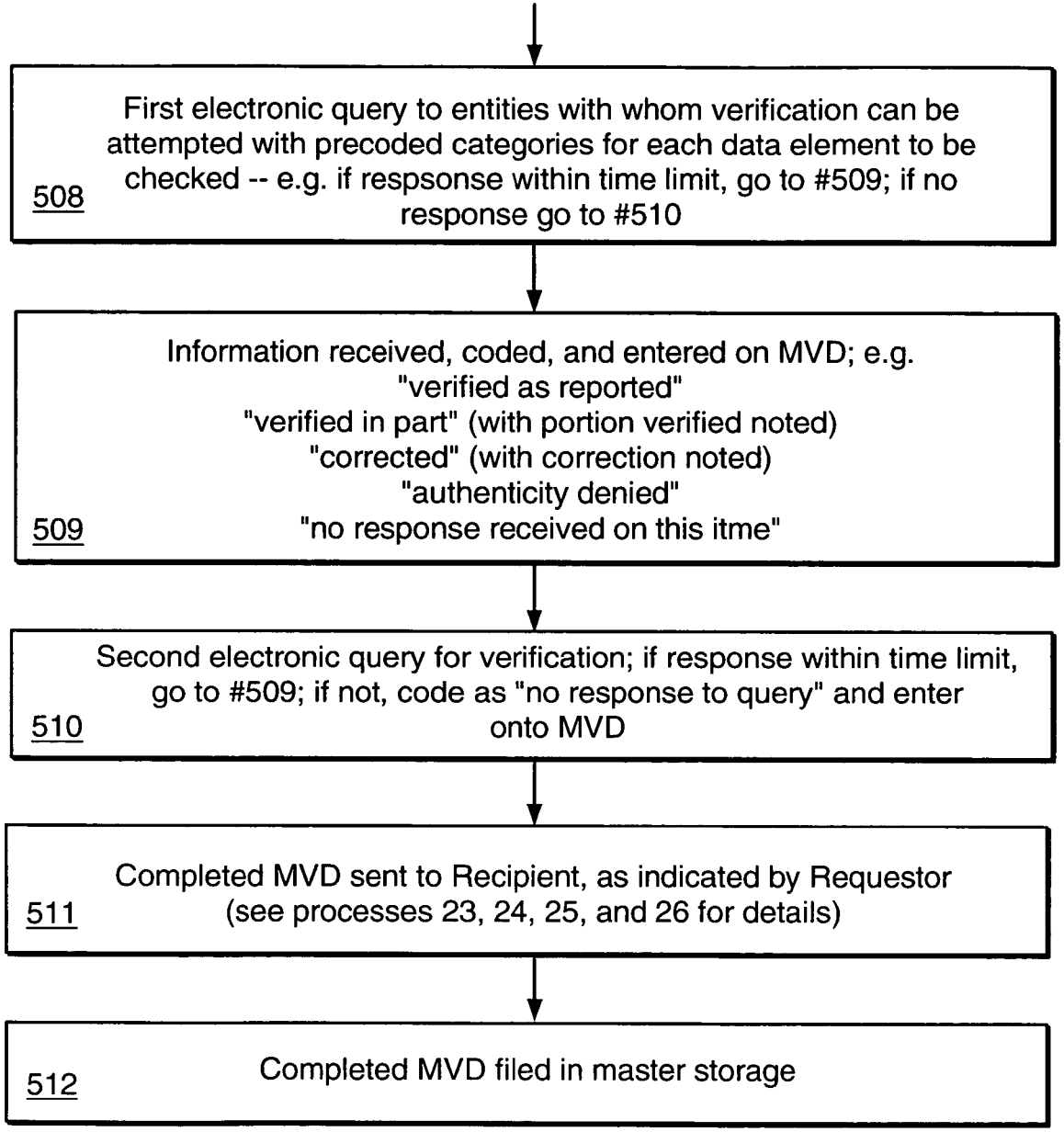

FIGS. 5A and 5B explain in detail the verification process, which is summarized as process 22 in the block diagram of FIG. 2. Once the registrant has entered data, as described above, the verification process occurs. As shown in box 501 of FIG. 5A, the registrant's data file, created in box 409 above, is first retrieved from storage, in the format of a Master Verification Document (MVD). The MVD has spaces for outcomes of query requests of the verification process, for each pertinent background data component; and a tracking number for the MVD. A tracking number is assigned to the MVD in box 502. The system reviews submitted data for completeness and errors, in box 503. If there are none, the process continues with box 506, below. If there are incomplete or flawed elements in the data record, as determined by pre-established standards programmed into the host computer, the system sends a query about the elements to the registrant (by e-mail, for example), along with a time limit for response (box 504). If the time limit is exceeded for the registrant's response, the system proceeds with box 506. In box 506, the MVD data is divided by third party entities to be contacted, and sorted into those with whom verification can be attempted (for use in box 508) and cannot be (for use in box 507). For those entities with whom verification cannot be attempted, a proper code is entered on the MVD in a data component set aside for such purpose (box 507).

FIG. 5B continues the verification process. As described in box 508, an electronic query is sent to third party entities with whom verification can be attempted. The query is associated with a precoded time limit for the third party entity to respond. If the third party responds within the time limit, the process continues with box 509; otherwise with box 510. In box 509, the information received from the third party entity is coded and entered on the MVD. The responses, entered on the MVD, may be "verified as reported," "verified in part" (with the portion verified noted), "corrected" (with the third party's correction noted), "authenticity denied," or "no response received on this item." Alternatively, the responses may be "confirmed," "claim is inaccurate," "unwilling to confirm or deny," or "unable to confirm or deny." In box 510, if no response is received within the time limit, a second query for verification is sent to the third party. If the second query is answered, the process goes to box 509. If not, the code "no response to query" is entered on the MVD. With the query process finished, a completed MVD may be sent to a recipient, as will be described below in connection with registrant-request process 23, process 24 for outside requests on a registrant, process 25 for outside requests on a non-registrant, and process 26 for finding a registrant (box 511). The completed MVD is stored in a data storage medium (box 512).

Note that, while FIGS. 5A and 5B have illustrated an electronic query process, some verification may be done by other means, particularly when third parties do not provide the necessary electronic connections. Thus, some verification may be performed by telephone, mail, or facsimile, or other conventional communication techniques.

Figure 6A:
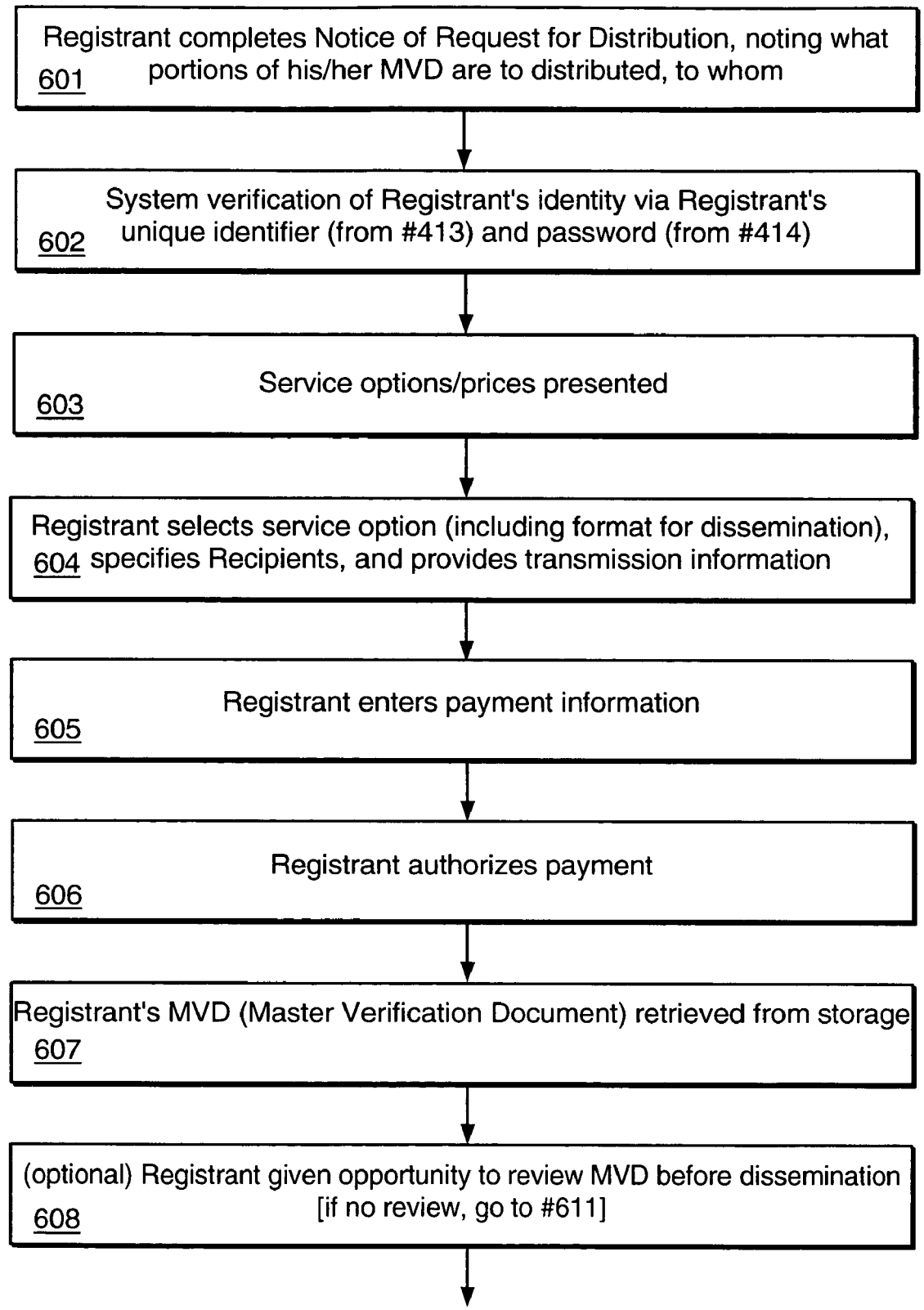
FIGS. 6A and 6B illustrate in further detail logical flow of the registrant-request process of an embodiment similar to that of FIG. 2.
Figure 6B:
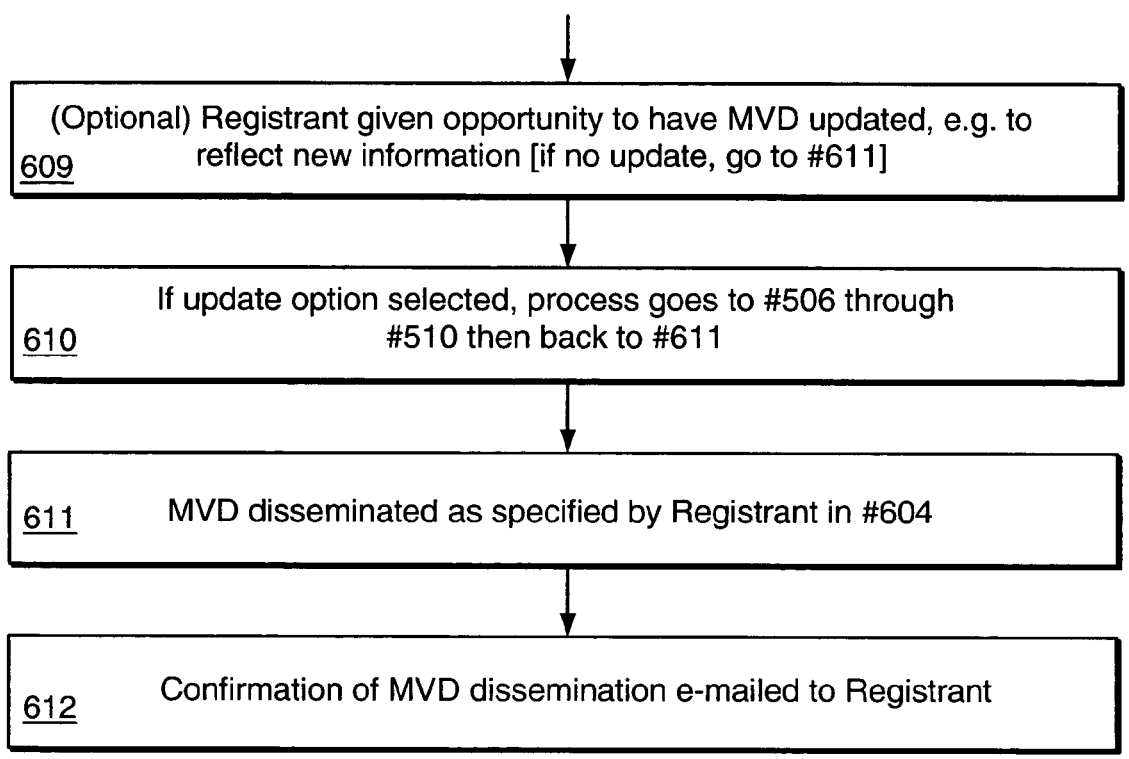

FIGS. 6A and 6B show in detail the registrant-request process 23, summarized in the block diagram of FIG. 2. In FIG. 6A, the registrant first completes a request for distribution, noting what portions of his or her MVD are to be distributed, and to whom (box 601). The MVD may be distributed to various third parties, including the types of third parties shown in FIG. 3. In one embodiment, the system allows the registrant to purchase, over the Internet or other network, electronic "chits," each of which allow the registrant to send a given number of verified résumés to third parties. In a further embodiment, the system generates a list of e-mail addresses for commonly-requested institutions, in order to aid the registrant in selecting third parties. Once the request for distribution is complete, the system verifies the registrant's identity by requiring the registrant to enter his unique identifier (from box 413 of FIG. 4B), and password (from box 414 of FIG. 4B). The registrant is presented with service options and prices (box 603); then the registrant selects a service option (including a choice of formats for distribution), specifies recipients, and provides transmission information (box 604). Once the registrant has entered payment information and authorized payment (boxes 605 and 606), the registrant's MVD is retrieved from storage (box 607), and, in some embodiments, the registrant is given the opportunity to review the MVD before dissemination (box 608). In other embodiments, the process continues with box 611 of FIG. 6B.

If the registrant is given the opportunity to review the MVD, then he or she is given the opportunity to have the MVD updated to reflect new or future information (box 609 of FIG. 6B). If the update option is selected (as in box 610 of FIG. 6B), the system, in one embodiment, repeats processes 506 through 510 and then the process continues with box 611 of FIG. 6B; in this case, information that has already been authenticated will remain present in the database, and new information will be added. Alternatively, the system may also give the registrant the opportunity to have the MVD updated at given intervals of time (e.g. every six months) or to have the MVD updated at registrant-determined intervals of time. In either case, the process continues with box 611 of FIG. 6B. In box 611, the MVD is disseminated as specified by the registrant in box 604. A confirmation of MVD dissemination is e-mailed to the registrant in box 612.

When the MVD is distributed, it may be distributed in the form of a certified, tamper-proof or tamper-revealing document, containing the data record. For example, the MVD may be distributed as a watermarked original document containing the data record. Alternatively, the MVD may be distributed as a notarized paper with a seal, or as an e-mail message or electronic file containing an electronic watermark or electronic certification. Electronic certification systems are available, for example, from RSA Security, Bedford, Mass., www.rsasecurity.com, including those using public-private key systems; the contents of this website are hereby incorporated herein by reference. In each case, the document is provided with a certification—that is, marked or identified in a way that is indicative of authentication of the document, and in a way that is appropriate for the medium of the document (whether paper, electronic, or otherwise).

Figure 7A:
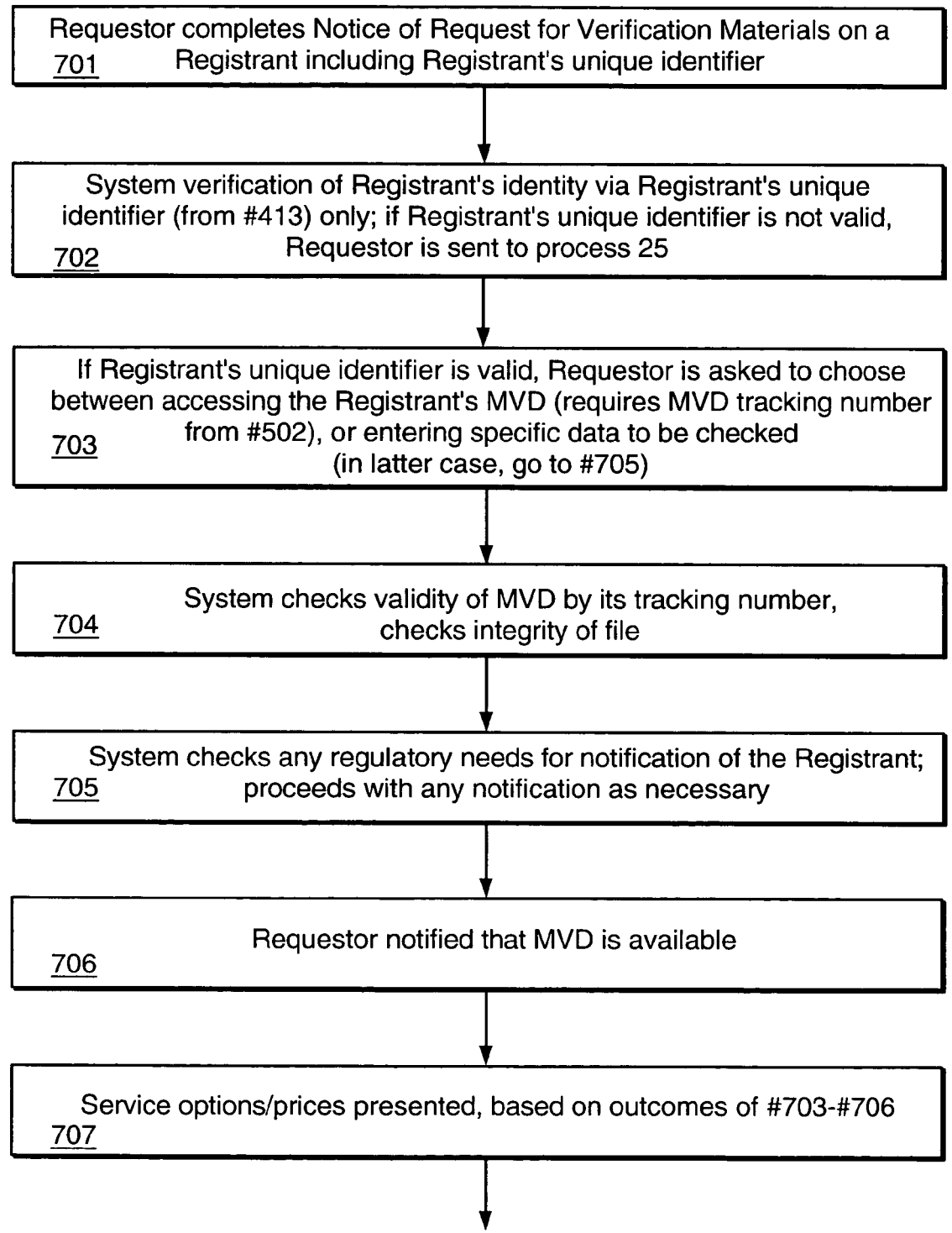
FIGS. 7A through 7C illustrate in further detail logical flow of the process for outside requests on a registrant of an embodiment similar to that of FIG. 2.
Figure 7B:
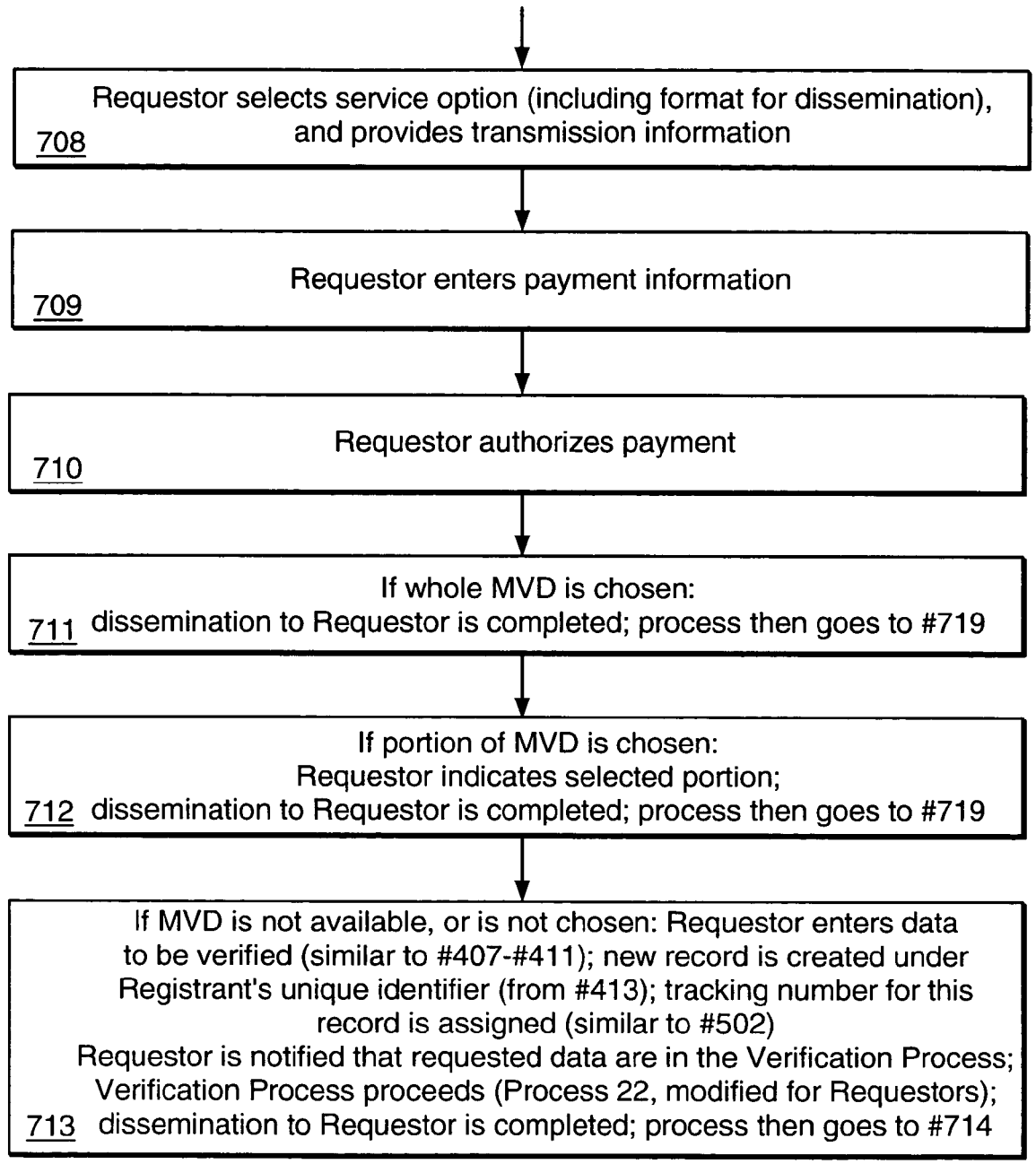
Figure 7C:
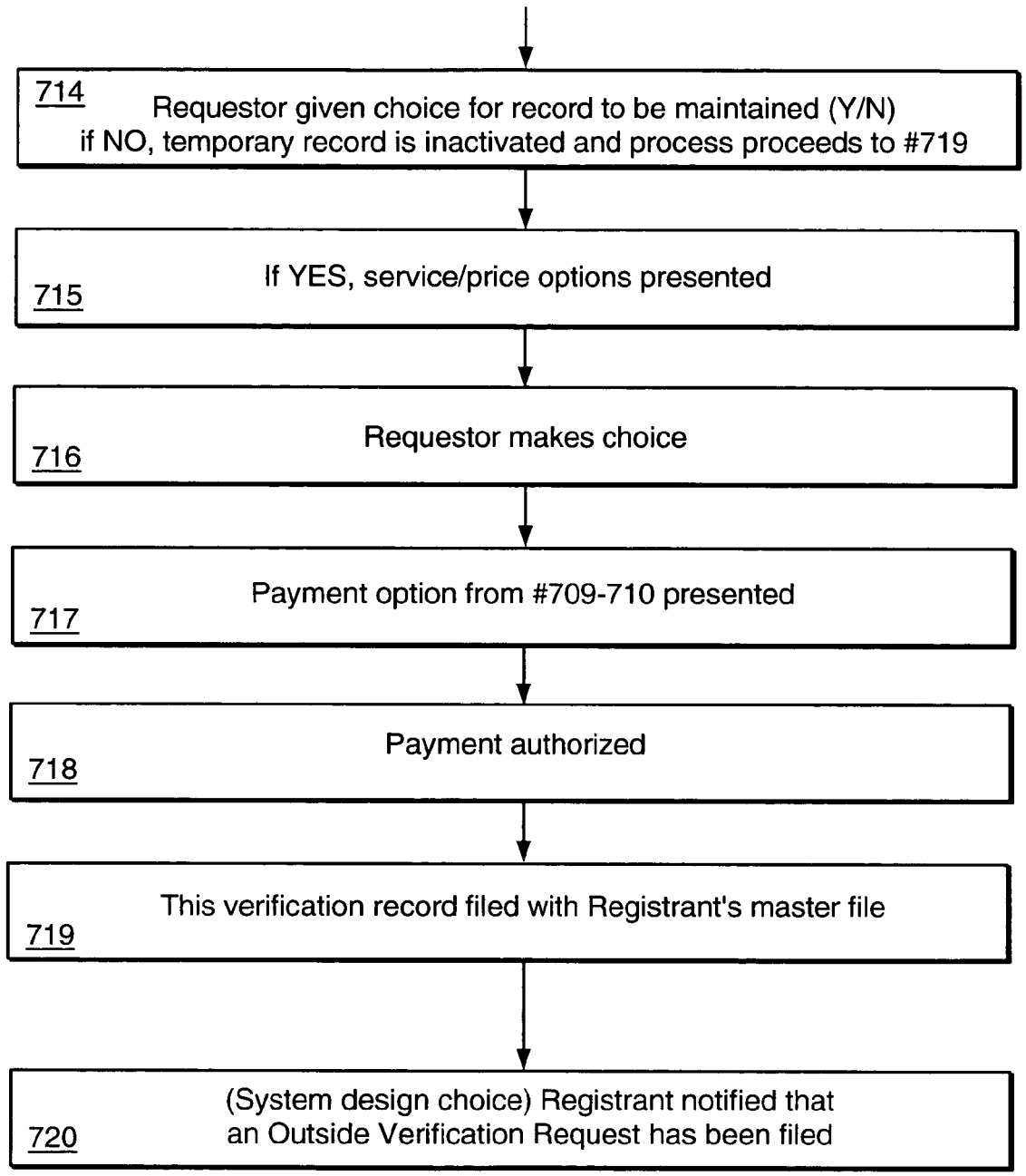

FIGS. 7A through 7C show the details of process 24 for outside requests on a registrant, summarized in the block diagram of FIG. 2. First, in box 701 of FIG. 7A, an outside requestor who wishes to receive verified background data information on a registrant completes a Notice of Request for Verification Materials on a Registrant, including the registrant's unique identifier. Next, the system verifies the registrant's identity via the registrant's unique identifier (from box 413 of FIG. 4B); if the identifier is not valid, the requestor is sent to process 25, described below (box 702). If the registrant's unique identifier is valid, the requester is asked in box 703 to choose between accessing the registrant's MVD (which requires the MVD tracking number from box 502), or entering specific data to be checked (in which case the process continues with box 705). The system checks the validity of the MVD by its tracking number and checks the integrity of the file (box 704). In box 705, the system checks whether pertinent legal regulations require that the registrant be notified of the request, and notifies the registrant if it is required. Next, the requester is notified that the MVD is available (box 706). Service options and prices are presented, based on the outcomes of boxes 703 through 706 (box 707), and the requester selects a service option (including the data format for dissemination), and provides transmission information (box 708).

Continuing as in FIG. 7B, the requester enters payment information (box 709) and authorizes payment (box 710). If the whole MVD is chosen to be distributed, dissemination to the requester is completed, and the process goes to box 719, below (box 711). If a portion of the MVD is chosen to be distributed, the requestor indicates the selected portion, and then dissemination to the requestor is completed, and the process goes to box 719. If any MVD data is unavailable, or is not chosen, the requestor first enters the data to be verified (box 713) in a fashion similar to boxes 407 through 411, above. A new record is created under the registrant's unique identifier (obtained from box 413, above), a tracking number is assigned for this record (in a similar fashion to box 502, above), and the requestor is notified that requested data are in the verification process. The verification process proceeds in a similar fashion to process 22 (described in detail above), and dissemination to the requestor is completed. The process continues with box 714.

In box 714 of FIG. 7C, the requester is given a choice for a record to be maintained. If he or she chooses not to maintain a record, the temporary record is inactivated, and the process proceeds to box 719. However, if he or she does choose to maintain a record, the service and price options are presented (box 715).

Continuing with box 716 of FIG. 7C, the requester makes the choice described in box 714, is presented with a payment option (box 717) and authorizes payment (box 718). The verification record is filed with the registrant's master file in a digital storage medium (box 719). In one embodiment, the registrant is notified that an Outside Verification Request has been filed (box 720).

Figure 8A:
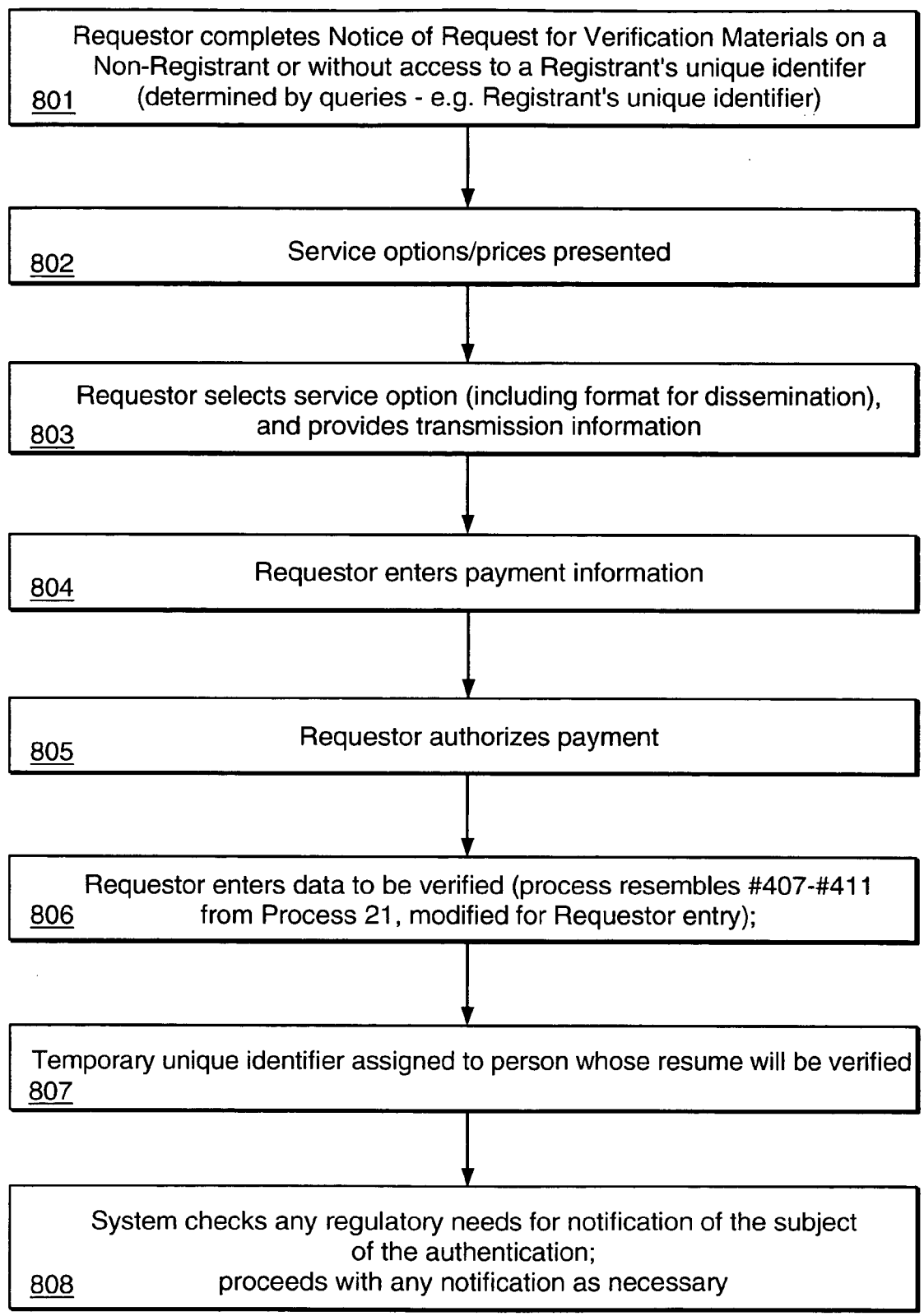
FIGS. 8A and 8B illustrate in further detail logical flow of the process for outside requests on a non-registrant of an embodiment similar to that of FIG. 2.
Figure 8B:
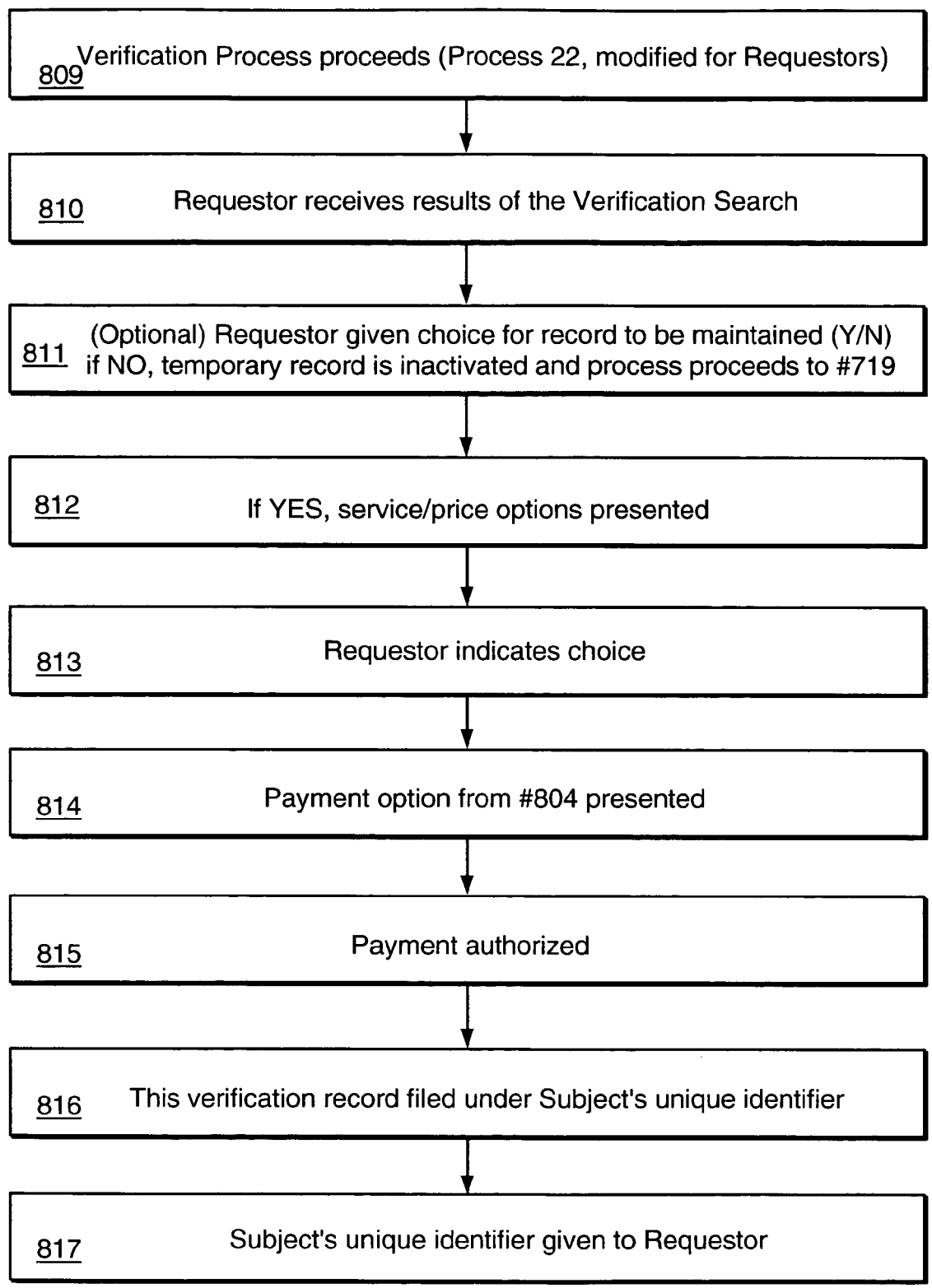

FIGS. 8A and 8B show the process for an outside request on a non-registrant, summarized as process 25 in the block diagram of FIG. 2. First, a requestor completes a Notice of Request for Verification Materials on a non-registrant or without access to the registrant's unique identifier (box 801). At this point, depending on the privacy laws of relevant jurisdictions, the system may not allow the requester to have any access to information about the non-registrant. Where these conditions do not pertain, the requestor is presented with service options and prices (box 802), selects a service option (including format for dissemination), and provides transmission information (box 803). The requester enters payment information (box 504) and authorizes payment (box 805). Next, the requester enters the data to be verified, in a process similar to that of boxes 407 to 411 of FIGS. 4A and 4B (box 806) and a temporary unique identifier is assigned to the person whose background data will be verified (box 807). The system next checks whether legal regulations require that the subject of the authentication be notified of the request, and notifies the subject if required. The verification process then proceeds, in a similar fashion to process 22 (box 809 of FIG. 8B).

Continuing with FIG. 8B, the requestor next receives the results of the verification process (box 810). In one embodiment, the requester is given the choice for a record to be maintained (box 811). If the choice is not to maintain a record, the temporary record is inactivated and the process continues with box 719. If a record will be maintained, the requestor is presented with service options and prices (box 812), and indicates his choice (box 813). The requestor is also presented with payment options (box 814) and payment is authorized (box 815). The verification record is filed under the subject person's unique identifier (box 816) and the person's unique identifier is given to the requestor (box 817).

In yet another embodiment of the present invention, there is an arrangement provided for searching a database of pre-authenticated background data. This embodiment facilitates interpersonal networking by enabling one to search through a database of personal background data that is authenticated, and enabling individuals to initiate registration with such a database. In this embodiment, the procedures described above for producing authenticated background data may typically be followed by numerous registrants. The result is a database of authenticated background data. Once such a database is created, members of the public, including employers, may cause a search of the database to be initiated. The searchers need not have the registrant's unique identifier. The search may use key words and topics of interest. The searchable database thus facilitates networking, by providing employers and others with the ability to initiate a search of a database of personal background data that is known to be authenticated, and by providing candidates with a forum where their background data can be found, and will not be discounted as potentially-dishonest.

Alternatively, the searchable database may be implemented as a database that is directly accessible over the Internet, including as a World Wide Web server accessible through an HTML-implemented, web-page search engine.

Key word search methods may be used with the searchable databases. See, for example, the methods described in U.S. Pat. No. 5,799,304 (Miller, "Information Evaluation"); U.S. Pat. No. 5,649,186 (Ferguson, "System and method for a computer-based dynamic information clipping service"); U.S. Pat. No. 5,537,586 (Amram et al., "Enhanced apparatus and methods for retrieving and selecting profiled textural information records from a database of defined category structures"); U.S. Pat. No. 5,418,951 (Damashek, "Method of retrieving documents that concern the same topic"); and U.S. Pat. No. 5,384,703 ("Withgott et al., "Method and apparatus for summarizing documents according to theme"), which are hereby incorporated herein by reference. Such search methods may be used to determine classes of data records to view as search results.

Embodiments of the invention provide particular advantages for networking because they allow for searching of data records where only fragmentary information is known about a person. For example, suppose a famous pastry chef registered with a database in a fashion similar to those described above. His authenticated personal background data would then appear in a data record accessible to those who have been given its identifier. Additionally, however, embodiments of the invention allow persons who wish to find the pastry chef to search through a database of authenticated personal background data. The searchers need not be employers, but could be interested in contacting the pastry chef for other reasons. They might have only fragmentary information about the chef. For example, while the data record contained the pastry chef's full name, education, employment background, and history of awards, the searchers might only know that the chef worked at a given restaurant two years ago. Using key word search techniques, each verifiable component of the data records in the database could be searched to find matches for the searchers' request.

Once it filters the data, the system provides searchers with a way of contacting the person whose record has been found. This contact method is provided by the registrant when he registers, in a fashion similar to that described above, and may include an e-mail address. Alternatively, the system may inform the registrant that the named requester is looking for someone, who may be the registrant, based on the set of data that the requestor has specified; thus leaving it to the registrant to contact the requestor if desired.

In an increasingly mobile world, the searchable database thus facilitates finding former colleagues, or members of other organizations, with skills or interests or characteristics that are being sought but on whom key data are now missing.

Note also that data records according to embodiments of the invention need not contain a complete record of a person's background data. Thus, for example, the pastry chef's data record might include only verifiable components related to his work at one restaurant, and not contain his educational background. In such a case, a search of the personal background database would only attempt to find a record based on the components that were present.

Figure 9A:
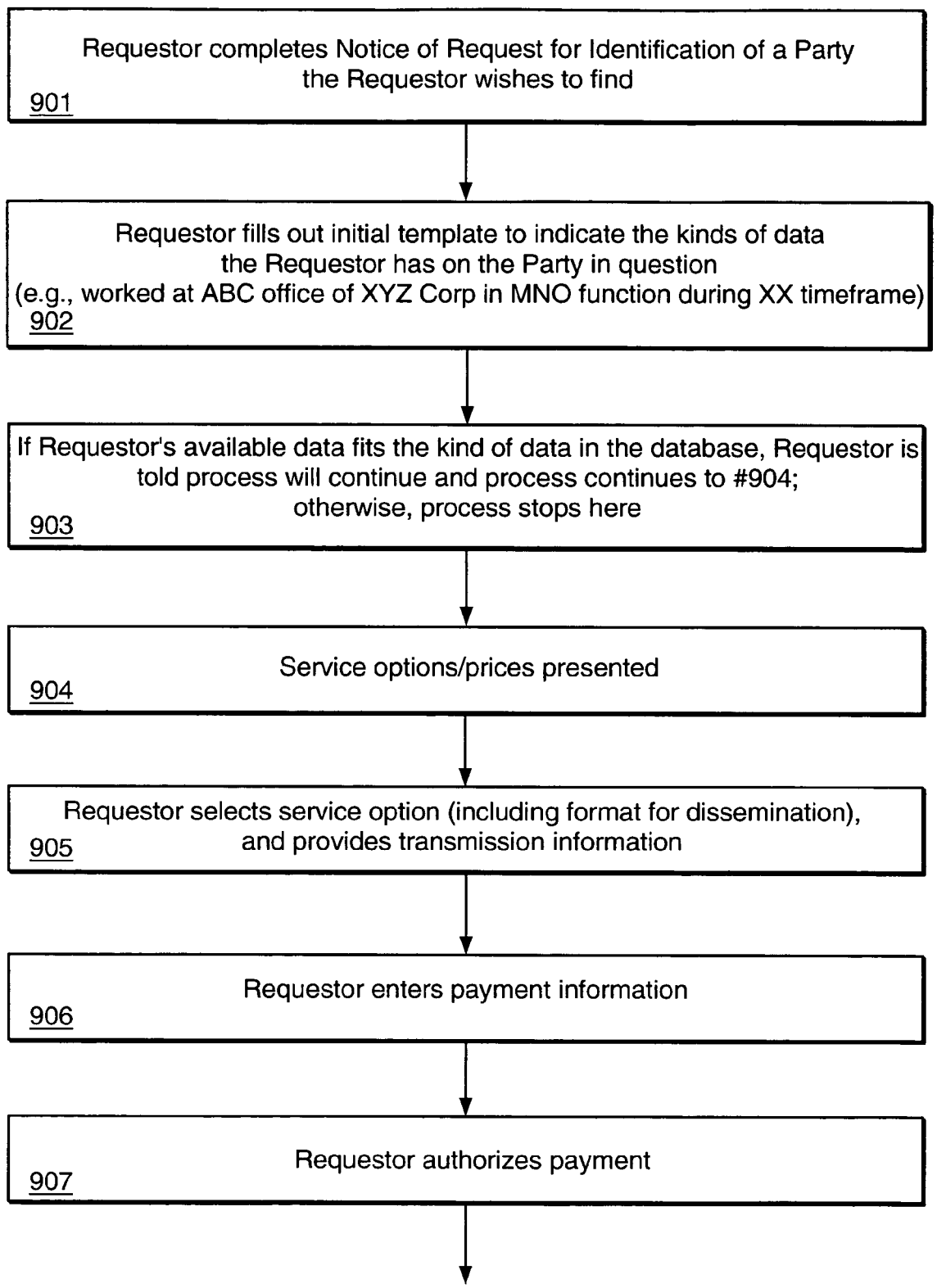
FIGS. 9A and 9B illustrate in further detail logical flow of the process for finding a registrant of an embodiment similar to that of FIG. 2.
Figure 9B:
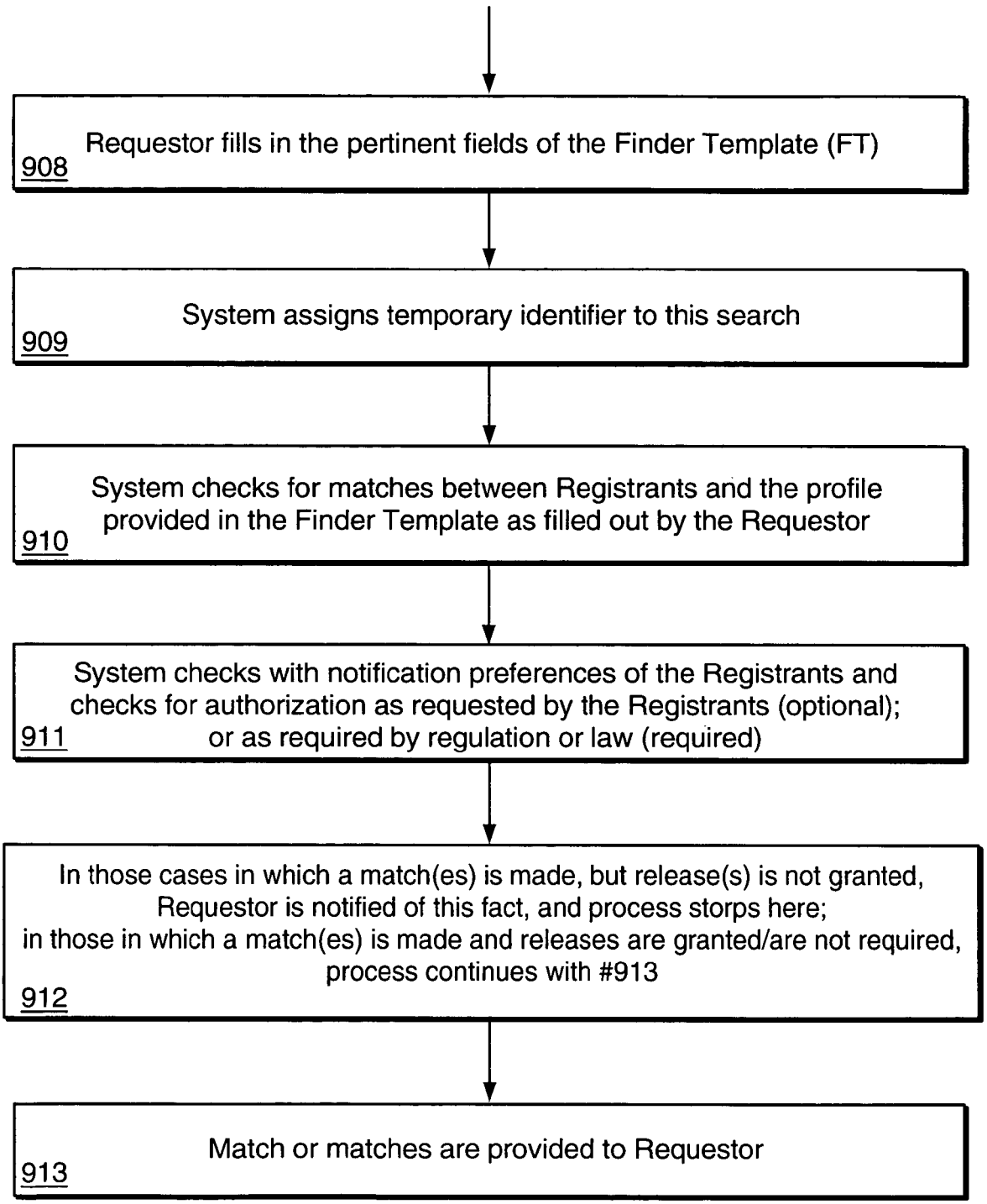

A searchable database embodiment is now described with reference to FIGS. 9A and 9B. The process flow shown in these figures is a detailed version of process 26 of FIG. 2, for finding a registrant.

First, at step 901, a requestor who wishes to find a party based on authenticated background data completes a Notice of Request for Identification of a Party, which may be implemented as a template-based form on an internet website. This Notice simply informs the system that the requester wishes to find a party, as opposed to using any of the other features of the system that are described above.

As described at step 902, the requester next fills out an initial template to indicate the kinds of data that the requestor has on the party. The system lists all of the kinds of data that it stores on registrants, next to a yes/no query on whether the user has that kind of information. If, for example, the requester knows that the party worked at an office of a given corporation, in a given city, in a given position, during a given timeframe, the requester would fill out the "yes" box next to the corporation, location, job position, and dates of employment fields.

At step 903, the system determines whether any of the listed fields has a "yes" box checked next to it. If none do, then the system informs the requestor that the system is unable to perform a search based on the kinds of information that the requestor has on the subject of the request, and the process is terminated.

If, however, it is determined that the requestor's information fits at least one of the fields of data in the database, the requestor is told that the process will continue, and the process continues with step 904. In step 904, the system presents the requestor with service options and prices. The options may include, for example, the textual format in which the search results will be disseminated, the means by which they will be distributed (e.g. by e-mail, fax, mail, etc.), and the number of reports which will be sent. The prices may vary based on the expense of the service options. The requester selects a service option, and provides information necessary to transmit the search results (e.g. e-mail addresses, mail addresses, etc.) (step 905). The requestor enters payment information and authorizes payment (steps 906 and 907).

At step 908, the requester is next presented with a Finder Template, which may be a web-page with a series of template fields for completion by the requestor. These fields are structured to elicit information from any of the fields of information in the database. For example, if the database has information on corporations that employed registrants, and dates that they did so, then there will be template fields corresponding to each of these types of information. Once the requester has filled out the Finder Template, the system assigns a temporary identifier to the search (step 909) and searches for registrants based on the profile provided in the requestor's Finder Template (step 910).

Once the system has found data records of registrants, it checks the data records to see whether each registrant wishes to be notified of any search requests which identify his data record, and whether each registrant has asked to authorize distribution of any search results (step 911). Such notification preferences are given by registrants when they register, in a manner similar to that described in the registration process above. If a registrant has chosen to be notified, the system notifies the registrant. If a registrant wishes to authorize distribution of results, the system sends a request for authorization to the registrant. Additionally, where pertinent laws require authorization in order to release background data, the system automatically sends a request for authorization to the registrant.

Next, if the system has found a record but a release is not granted, the requester is notified that the subject party has not authorized release of the record, and the process is terminated (step 912). If the system has found a record, and necessary authorization has been given, or if no authorization was required at all, the process continues with step 913.

Finally, in step 913, the system distributes records to the requester, in accordance with the service option which the requestor selected. In this way, the process flow of FIGS. 9A and 9B allows people to search for information in a database of pre-authenticated personal background data.

It should be noted that the systems and methods described above should not be confused with systems and methods for verifying that a given holder of a set of data on a person is indeed that person. The latter systems and methods include, for example, fingerprinting. Rather, the systems and methods described above relate to authenticating personal background data, whether held by a job candidate or any other person, and also to structuring a database to provide access to authenticated personal background data.

Although this description has set forth the invention with reference to several preferred embodiments, those of ordinary skill in the art will understand that one may make various modifications without departing from the spirit and the scope of the invention, as set forth in the claims.

What is claimed is:

1. A method of providing access to a candidate's personal background data, wherein the data have been verified, the method comprising:
    a. establishing a data record relating to the candidate's personal background data, in a digital storage medium, the data record having a candidate identifier that identifies the candidate and including
        (i) a set of components based on information supplied by the candidate, each component being potentially verifiable, and
        (ii) a corresponding set of query results obtained at a first time, the corresponding set including, with respect to each component, the result of a verification query to a third party;
    b. communicating the candidate identifier to the candidate;
    c. receiving after the first time, over a communication network, the candidate identifier from an outside user wanting verification of the candidate's personal background data, the outside user having received the candidate identifier directly or indirectly from the candidate; and
    d. distributing, to the outside user, over the communication network, in response to receiving the candidate identifier, an electronic document including the data record and an electronic authentication of the contents of the data record, the electronic authentication capable of revealing unauthorized modifications of the contents of the data record.

2. A method according to claim 1, wherein establishing the data record includes:
    a. from a computer at a first location, separately specifying over a network to a host computer a set of components of the candidate's personal background data, each component being potentially verifiable by contacting a third party;
    b. storing, in a digital storage medium in communication with the host computer, the set of components;
    c. for each component of the set,
        identifying a relevant third party and pertinent contact information therefor;
        communicating a query to the relevant third party to verify the component, and
        obtaining a query result from the query; and
        associating the query result with the component and storing the query result in the storage medium.

3. A method according to claim 2, wherein specifying the set of components includes providing responses via a set of templates, the set of templates having at least one member and being structured to evince the content of the set of components.

4. A method according to claim 2, wherein specifying the set of components is performed over the Internet.

5. A method according to claim 4, in which obtaining a query result from the query is performed over the Internet.

6. A method according to claim 4, wherein specifying the set of components includes specifying the set of components to a World Wide Web server.

7. A method according to claim 6, in which communicating a query to the relevant third party to verify the component is performed over the Internet.

8. A method according to claim 7, wherein communicating a query to the relevant third party to verify the component is performed automatically and includes sending the query as E-Mail.

9. A method according to claim 1, in which communicating the identifier to the candidate is performed over the Internet.

10. A method according to claim 9, wherein communicating the identifier to the candidate is performed automatically and includes sending the identifier as E-Mail over the Internet.

11. A method according to claim 1, wherein the electronic document is distributed in the form of an electronic mail message.

12. A method according to claim 1, wherein the electronic document is distributed in the form of an electronic file.

13. A method according to claim 1, wherein the electronic authentication is an electronic watermark.

14. A method according to claim 1, wherein the electronic authentication is an electronic certification.

15. A method according to claim 1, wherein the set of components includes the candidate's résumé information, and wherein the set of query results includes information verifying the candidate's résumé information.

16. A system for providing access to a candidate's personal background data, wherein the data have been verified, the system comprising:
    (a) a storage arrangement on which is stored a database having a plurality of data records, each data record relating to personal background data of a candidate, each data record having a candidate identifier that identifies the candidate and that is communicated to the candidate, each data record including
        (i) a set of components based on information supplied by a candidate, each component being potentially verifiable, and
        (ii) a corresponding set of query results obtained at a first time, the corresponding set including, with respect to each component, the result of a verification query to a third party; and
    (b) a process, running on a computer in communication with the storage arrangement, for selectively distributing, to an authorized person presenting an identifier received directly or indirectly from the candidate, in response to receiving the identifier after the first time, over a communication network, an electronic document including the candidate's data record and an electronic authentication of the contents of the data record, the electronic authentication capable of revealing unauthorized modifications of the contents of the data record.

* * * * *

UNITED STATES PATENT AND TRADEMARK OFFICE
CERTIFICATE OF CORRECTION

PATENT NO. : 8,037,539 B2
APPLICATION NO. : 10/786355
DATED : October 11, 2011
INVENTOR(S) : Eileen C. Shapiro et al.

It is certified that error appears in the above-identified patent and that said Letters Patent is hereby corrected as shown below:

In the Claims

In Col. 12, line 37
replace "résuméinformation"
with "résumé information"

In Col. 12, line 39
replace "résuméinformation"
with "résumé information"

Signed and Sealed this
Ninth Day of July, 2013

Teresa Stanek Rea
*Acting Director of the United States Patent and Trademark Office*